US011025426B2

(12) United States Patent
Daemen et al.

(10) Patent No.: US 11,025,426 B2
(45) Date of Patent: Jun. 1, 2021

(54) ENCRYPTION FUNCTION AND AUTHENTICATION OF A REPLACEABLE PRINTER COMPONENT

(71) Applicant: PROTON WORLD INTERNATIONAL N.V., Diegem (BE)

(72) Inventors: Joan Daemen, Malden (NL); Michael Peeters, Tourinnes-la-Grosse (NL)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 331 days.

(21) Appl. No.: 16/249,799

(22) Filed: Jan. 16, 2019

(65) Prior Publication Data
US 2019/0222421 A1 Jul. 18, 2019

(30) Foreign Application Priority Data

Jan. 16, 2018 (FR) ........................................ 1850331
Jan. 8, 2019 (EP) ........................................ 19150830

(51) Int. Cl.
*H04L 9/32* (2006.01)
*H04L 9/00* (2006.01)
*H04L 9/06* (2006.01)

(52) U.S. Cl.
CPC ............ *H04L 9/3236* (2013.01); *H04L 9/004* (2013.01); *H04L 9/0625* (2013.01); *H04L 9/0643* (2013.01)

(58) Field of Classification Search
CPC .... H04L 9/3236; H04L 9/0625; H04L 9/0643
USPC ........................................................ 713/176
See application file for complete search history.

(56) References Cited

U.S. PATENT DOCUMENTS

| 5,048,086 | A | 9/1991 | Bianco et al. |
| 5,982,900 | A | 11/1999 | Ebihara et al. |
| 6,125,182 | A | 9/2000 | Satterfield |
| 6,298,135 | B1 | 10/2001 | Messerges et al. |
| 7,188,258 | B1 | 3/2007 | Aggarwal et al. |

(Continued)

FOREIGN PATENT DOCUMENTS

| EP | 2 523 385 A1 | 11/2012 |
| EP | 2 523 485 A1 | 11/2012 |
| EP | 1 260 054 B1 | 4/2013 |

OTHER PUBLICATIONS

Bertoni et al., "CAESAR submission: KETJE v2," Sep. 15, 2016, URL=http://ketje.neokeon.org/, 18 pages.

(Continued)

*Primary Examiner* — Peter C Shaw
(74) *Attorney, Agent, or Firm* — Seed IP Law Group LLP

(57) ABSTRACT

The disclosure concerns an encryption function applied to a first word, a second word, a third word, and a fourth word including: multiplying the third word by the fourth word; adding the result of the multiplication; subtracting the result of the addition to the second word from the result of the addition to the first word; adding the result of the subtraction; combining with a constant the result of the addition of the third word to the result of the subtraction; and multiplying by two the result of said combination and circularly shifting the codes of the respective results of the addition of the fourth word to the result of the subtraction, of the addition of the second word to the result of the multiplication, and of the addition of the first word to the result of the multiplication.

44 Claims, 4 Drawing Sheets

(56) References Cited

U.S. PATENT DOCUMENTS

| | | | |
|---|---|---|---|
| 7,200,225 B1 | 4/2007 | Schroeppel | |
| 7,421,496 B2 | 9/2008 | Motoyama | |
| 7,580,472 B2 | 8/2009 | Lablans | |
| 7,631,190 B2 * | 12/2009 | Walmsley | H04L 9/12 380/44 |
| 7,739,198 B2 * | 6/2010 | Adkins | G06Q 30/02 705/76 |
| 7,856,103 B2 * | 12/2010 | Kimura | H04L 9/3271 380/44 |
| 8,386,800 B2 | 2/2013 | Kocher et al. | |
| 8,532,506 B2 * | 9/2013 | Jones | G03G 15/0863 399/12 |
| 9,485,087 B2 | 11/2016 | Van Assche et al. | |
| 9,815,289 B2 * | 11/2017 | Ness | B41J 2/17526 |
| 2003/0120944 A1 | 6/2003 | Kim et al. | |
| 2004/0078570 A1 | 4/2004 | Geiringer et al. | |
| 2004/0083251 A1 | 4/2004 | Geiringer et al. | |
| 2004/0125950 A1 | 7/2004 | Yen et al. | |
| 2005/0116740 A1 | 6/2005 | Elbe et al. | |
| 2005/0195975 A1 | 9/2005 | Kawakita | |
| 2008/0140739 A1 | 6/2008 | Elbe et al. | |
| 2008/0250244 A1 | 10/2008 | Baentsch et al. | |
| 2008/0260150 A1 | 10/2008 | De Clercq | |
| 2009/0060202 A1 | 3/2009 | Lablans | |
| 2009/0067617 A1 | 3/2009 | Trichina et al. | |
| 2010/0067690 A1 | 3/2010 | Han et al. | |
| 2014/0055290 A1 | 2/2014 | Lablans | |

OTHER PUBLICATIONS

Bertoni et al., "CAESAR submission: KEYAK v2," Sep. 15, 2016, URL=http://keyak.neokeon.org/, 35 pages.

Bertoni et al., "Cryptographic sponge functions," Jan. 14, 2011, URL=http://spong.neokeon.org/, 93 pages.

Bertoni et al., "On the Indifferentiability of the Sponge Construction," in Smart (ed.), *Advances in Cryptology—Eurocrypt 2008*, Springer, New York City, New York, USA, 2008, pp. 181-197.

Daemen et al., "Full-State Keyed Duplex With Built-In Multi-User Support," $23^{rd}$ *International Conference on the Theory and Applications of Cryptology and Information Security*, Hong Kong, China, Dec. 3-7, 2017, pp. 606-637.

European Search Report, dated Oct. 11, 2011, for European Application No. 11164951.3-2415, 7 pages.

French Search Report and Written Opinion, dated Oct. 2, 2018, for French Application No. 1850331, 7 pages.

Knuth, *The Art of Computer Programming*, $2^{nd}$ ed., vol. 3, Sorting and Searching, Chapter 6.4, "Hashing," Addison Wesley Longman, Reading, Massachusetts, USA, 1998, pp. 513-558. (49 pages).

Menezes et al., *Handbook of Applied Cryptography*, Chapter 7.3.3, "Polyalphabetic Substitutions and Vigenere Ciphers (Historical)," CRC Press, Boca Raton, Florida, USA, 1997, pp. 241-242.

Millikin, *Elementary Cryptography and Cryptoanalysis*, Chapter XIV, "Square Tables, Discs and Slide Rules: The Vigenere Cipher," New York University Bookstore, New York City, New York, USA, 1943, pp. 88-90.

Elbirt, et al., "An Instruction-Level Distributed Processor for Symmetric-Key Cryptography," *IEEE Transactions on Parallel and Distributed Systems* 16(5):468-480, 2005.

\* cited by examiner

ENCRYPTION FUNCTION AND AUTHENTICATION OF A REPLACEABLE PRINTER COMPONENT

BACKGROUND

Technical Field

The present disclosure generally concerns electronic circuits and systems executing cryptographic operations, such as a method and a circuit for the authentication of a printer cartridge.

Description of the Related Art

Many encryption techniques are known to protect information (data, keys, etc.) against non-authorized accesses (hacking). Such techniques may be used for signature purposes to guarantee the authenticity or the origin of information or of a product, for actual ciphering purposes to prevent a pirate from knowing certain information, etc.

To attempt discovering the protected quantities (keys or data), pirates or hackers implement different categories of attacks. These may be attacks by analysis of the circuit response (in terms of power consumption, of radiation, etc.) which are called side channel attacks. Another category of attacks comprises introducing a disturbance in the circuit operation and analyzing the consequences thereof on the direct or indirect response (fault injection attack).

An encryption algorithm generally implements, to process a message, a function forming a non-linear permutation based on a plurality of executions of a same succession of elementary operations. The succession of elementary operations is generally called round or round function. The function generally reuses the result of the previous round like one of the operands applied to the current round. The number of rounds generally conditions the resistance of the algorithm to attack.

The present disclosure more particularly concerns a permutation encryption function, which may be used, for example, for hashing, ciphering, or a signature calculation.

BRIEF SUMMARY

In an embodiment, a method comprises: protecting, using four words, each word representing codes in base 7, an electronic circuit during execution of a cryptographic operation by the electronic circuit. The protecting includes: multiplying, code by code, a third word of the four words by a fourth word of the four words; adding, code by code, a result of the multiplying to a first word of the four words; adding, code by code, the result of the multiplying to a second word of the four words; subtracting, code by code, a result of the addition to the second word from a result of the addition to the first word; adding, code by code, a result of the subtraction to the third word; adding the result of the subtraction to the fourth word; combining, code by code, with a round constant, a result of the adding the third word to the result of the subtraction; multiplying by two, code by code, a result of said combination; circularly shifting codes of a result of the adding the fourth word to the result of the subtraction; circularly shifting codes of the result of adding the second word to the result of the multiplication; and circularly shifting codes of the result of adding the first word to the result of the multiplication. In an embodiment, each word comprises thirty-two codes. In an embodiment, the circular shifts are respectively by one, five, and fourteen positions. In an embodiment, each code in base 7 is represented as a triplet of binary states. In an embodiment, the protecting is an iterative process, a last state of an iteration forming an initial state of a next iteration. In an embodiment, the cryptographic operation comprises a hashing function. In an embodiment, the method comprises converting a message to base 7. In an embodiment, the protecting is an iterative process applied a plurality of times. In an embodiment, the protecting comprises protecting information manipulated by the electronic circuit. In an embodiment, an occurrence of a determined triplet identifies an error.

In an embodiment, a device comprises: one or more memories; and digital signal processing circuitry coupled to the one or more memories, which, in operation, protects, using four words, each word representing codes in base 7, a cryptographic operation. The protecting includes: multiplying, code by code, a third word of the four words by a fourth word of the four words; adding, code by code, a result of the multiplying to a first word of the four words; adding, code by code, the result of the multiplying to a second word of the four words; subtracting, code by code, a result of the addition to the second word from a result of the addition to the first word; adding, code by code, a result of the subtraction to the third word; adding the result of the subtraction to the fourth word; combining, code by code, with a round constant, a result of the adding the third word to the result of the subtraction; multiplying by two, code by code, a result of said combination; circularly shifting codes of a result of the adding the fourth word to the result of the subtraction; circularly shifting codes of the result of adding the second word to the result of the multiplication; and circularly shifting codes of the result of adding the first word to the result of the multiplication. In an embodiment, each word comprises thirty-two codes. In an embodiment, the circular shifts are respectively by one, five, and fourteen positions. In an embodiment, each code in base 7 is represented as a triplet of binary states. In an embodiment, the protecting is an iterative process, a last state of an iteration forming an initial state of a next iteration. In an embodiment, the cryptographic operation comprises a hashing function. In an embodiment, the protecting comprises generating the four words. In an embodiment, the protecting comprises protecting information manipulated by the cryptographic operation. In an embodiment, an occurrence of a determined triplet identifies an error in the cryptographic operation.

In an embodiment, a system comprises: one or more functional circuits; and digital signal processing circuitry coupled to the one or more functional circuits, which, in operation, protects, using four words, each word representing codes in base 7, execution of a cryptographic operation. The protecting includes: multiplying, code by code, a third word of the four words by a fourth word of the four words; adding, code by code, a result of the multiplying to a first word of the four words; adding, code by code, the result of the multiplying to a second word of the four words; subtracting, code by code, a result of the addition to the second word from a result of the addition to the first word; adding, code by code, a result of the subtraction to the third word; adding the result of the subtraction to the fourth word; combining, code by code, with a round constant, a result of the adding the third word to the result of the subtraction; multiplying by two, code by code, a result of said combination; circularly shifting codes of a result of the adding the fourth word to the result of the subtraction; circularly shifting codes of the result of adding the second word to the result of the multiplication; and circularly shifting codes of the result of adding the first word to the result of the multiplication. In an embodiment, a result of the cryptographic operation is related to a function of the functional circuitry. In an embodiment, each code in base 7 is represented as a triplet of binary states. In an embodiment, the protecting includes detecting an error during execution of the cryptographic operation. In an embodiment, the error is a fault injection error.

In an embodiment, a non-transitory computer-readable medium's contents configure digital signal processing circuitry to perform a method. The method comprises protecting, using four words, each word representing codes in base 7, a cryptographic operation executed by the digital signal processing circuitry, the protecting including: multiplying, code by code, a third word of the four words by a fourth word of the four words; adding, code by code, a result of the multiplying to a first word of the four words; adding, code by code, the result of the multiplying to a second word of the four words; subtracting, code by code, a result of the addition to the second word from a result of the addition to the first word; adding, code by code, a result of the subtraction to the third word; adding the result of the subtraction to the fourth word; combining, code by code, with a round constant, a result of the adding the third word to the result of the subtraction; multiplying by two, code by code, a result of said combination; circularly shifting codes of a result of the adding the fourth word to the result of the subtraction; circularly shifting codes of the result of adding the second word to the result of the multiplication; and circularly shifting codes of the result of adding the first word to the result of the multiplication. In an embodiment, each word comprises thirty-two codes. In an embodiment, the contents comprise instructions executed by the digital signal processing circuitry.

An embodiment provides an encryption function that facilitates protecting a ciphering or a signature against side channel or fault injection attacks.

An embodiment provides a permutation encryption function which facilitates detecting an intentional or incidental malfunction.

An embodiment provides a solution of authentication of a replaceable printer component, for example, an ink cartridge.

An embodiment provides a mechanism of authentication of a printer cartridge by a printer.

An embodiment provides an encryption function executed by an electronic circuit, applied to a first word, a second word, a third word, and a fourth word, all representing codes in base 7, comprising:

a step of multiplying, code by code, the third word by the fourth word;

a step of adding, code by code, respectively to the first word and to the second word, the result of the multiplication;

a step of subtracting, code by code, the result of the addition to the second word from the result of the addition to the first word;

a step of adding, code by code, the result of the subtraction respectively to the third word and to the fourth word;

a step of combining, code by code, with a round constant, the result of the step of adding the third word to the result of the subtraction; and a step of multiplying by two, code by code, the result of said combination and of circularly shifting the codes of the respective results of the step of adding the fourth word to the result of the subtraction, of the step of adding the second word to the result of the multiplication, and of the step of adding the first word to the result of the multiplication.

According to an embodiment, each word comprises thirty-two codes.

According to an embodiment, the circular shifts are respectively by one, by five, and by fourteen positions.

According to an embodiment, each code in base 7 is represented in the form of a triplet of binary states.

According to an embodiment, the steps are executed a plurality of times, the last state of an iteration forming the initial state of a next iteration.

An embodiment provides a hashing method implementing at least one encryption function.

According to an embodiment, a message is converted to base 7 to be applied to said function.

According to an embodiment, the function is applied a plurality of times.

An embodiment provides a method of protecting information manipulated by an electronic circuit, implementing the hashing method.

According to an embodiment, the occurrence of a determined bit triplet identifies an error.

An embodiment provides a computer product-program comprising instructions which, when they are executed by a processor, make the processor implement a function or a method such as described.

An embodiment provides a memory storing instructions which, when they are implemented by a processor, make the processor implement a function and/or a method such as described.

An embodiment provides a memory containing a set of results representative of the application of a function and/or of a method such as described, to a set of numbers.

An embodiment provides an electronic circuit, configured to execute an encryption operation implementing a function and/or a method such as described.

An embodiment provides an electronic circuit configured to receive a number, and to output a result representative of the application of a function and/or of a method such as described.

An embodiment provides a circuit and/or a memory and/or a computer product-program, for a replaceable printer component.

An embodiment provides a circuit and/or a memory and/or a computer product/program, for a printer.

An embodiment provides a method of authentication of a replaceable printer component by a printer, comprising at least one step of implementation, by a printer component, of a function and/or of a method such as described.

An embodiment provides a circuit, comprising at least one processing unit, said processing unit being configured to implement an authentication method such as described.

An embodiment provides a replaceable printer component comprising a circuit and/or a memory such as described.

According to an embodiment, the component forms an ink cartridge.

An embodiment also provides a circuit of execution of an encryption operation.

The foregoing and other features and advantages will be discussed in detail in the following non-limiting description of specific embodiments in connection with the accompanying drawings.

DETAILED DESCRIPTION

Figure 1:
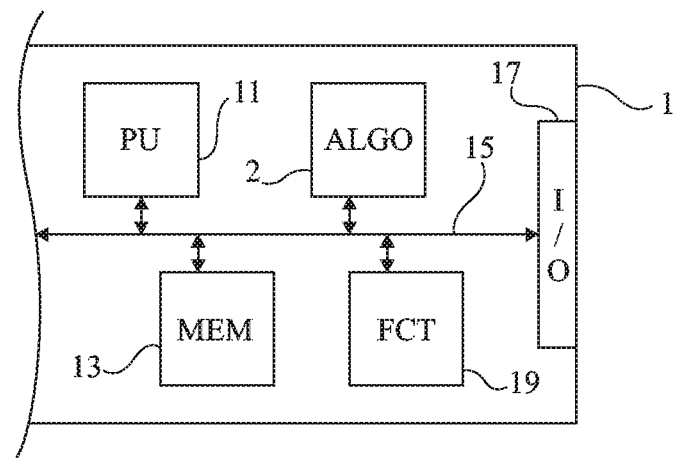
FIG. 1 very schematically shows, in the form of blocks, an embodiment of an electronic circuit of the type to which the embodiments which will be described apply.

The same elements have been designated with the same reference numerals in the different drawings unless the context indicates otherwise. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the described encryption function may be implemented in various encryption schemes which have not been detailed, this function being compatible with such usual schemes. Further, an example of final application implementing the described embodiments to a printer cartridge authentication method is described. However, the described encryption function applies to other mechanisms of authentication, be it of replaceable printer components or others. The described embodiments are indeed compatible with usual applications of an encryption function.

Unless otherwise specified, the term "connected" is used to designate a direct electric connection, with no intermediate component other than conductors, and the term "coupled" or the term "linked" is used to designate a connection which may be direct or which may be performed via one or a plurality of other components.

In the present description, reference will be made to "0" and to "1" to designate respective low and high states of the digital signals. Unless otherwise specified, state 0 represents the inactive state of a control signal.

The terms "about", "approximately", "substantially", and "in the order of" are used herein to designate a tolerance of plus or minus 10%, preferably of plus or minus 5%, of the value in question.

FIG. 1 very schematically shows an embodiment of an electronic circuit 1 of the type to which the described embodiments apply.

Circuit 1 comprises:

a processing circuit 11 (PU), for example, a state machine, a microprocessor, a programmable logic circuit, one or more processing cores, etc.;

one or a plurality of volatile and/or non-volatile storage areas 13 (MEM) for storing all or part of the data and programs;

one or a plurality of data, address, and/or control buses 15 between the different elements internal to circuit 1;

an input-output interface 17 (I/O) for communicating with the outside of circuit 1; and various other circuits according to the application, symbolized in FIG. 1 by a block 19 (FCT).

According to the shown embodiment, circuit 1 further comprises an encryption circuit or function 2 (ALGO) implementing one or a plurality of encryption algorithms. Element 2 may be a hardware circuit executing the encryption algorithm in hardware fashion (wired logic), a software function executing a program implemented by a processor (for example, circuit 11) or a combination of both. In the example of application to printer cartridges, a cartridge and a printer are equipped with circuits of the type in FIG. 1.

To make the hackers' task more complex, it has already been provided to manipulate, in an encryption algorithm, non-binary numbers, shown in a base different from base 2. For example, documents EP-A-2 523 485 and U.S. Pat. No. 9,485,087 describe certain principles of a use of numbers represented in a base greater than 2.

According to the described embodiments, it is provided to use a representation in base 7. Such a representation in base 7, or modulo 7, provides the encryption function with a significant robustness and rapidity which will appear from the described embodiments.

Further, an embodiment implements such a representation in base 7 in a function executable in rounds, that is, compatible with a succession of executions of the same elementary operations, by using, as an input operand (state), the result (output state) of the previous round.

Figure 2:
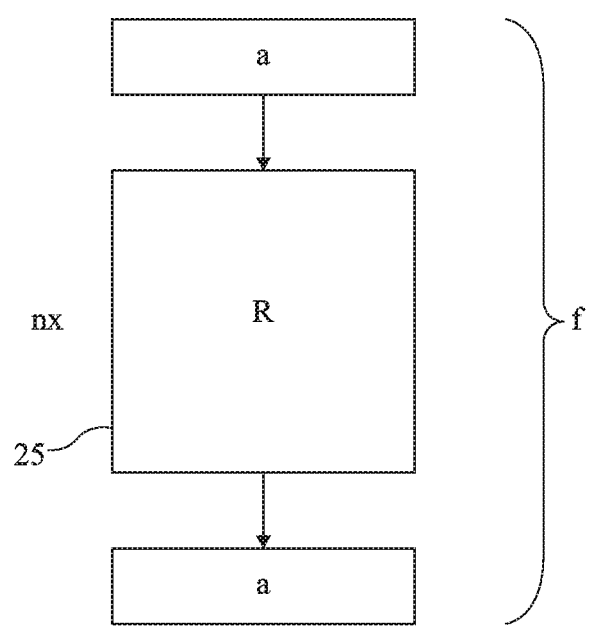
FIG. 2 very schematically shows in the form of blocks an embodiment of an encryption function.

FIG. 2 very schematically shows in the form of blocks an embodiment of a function performing an encryption permutation f.

Function f receives as an input a block or state a represented in base 7, which is submitted (step 25, R) to a processing in rounds of function f. Number n of rounds is selected according to the resistance desired for the algorithm. Function f provides as a result a block a of same size as the input block.

Figure 3:
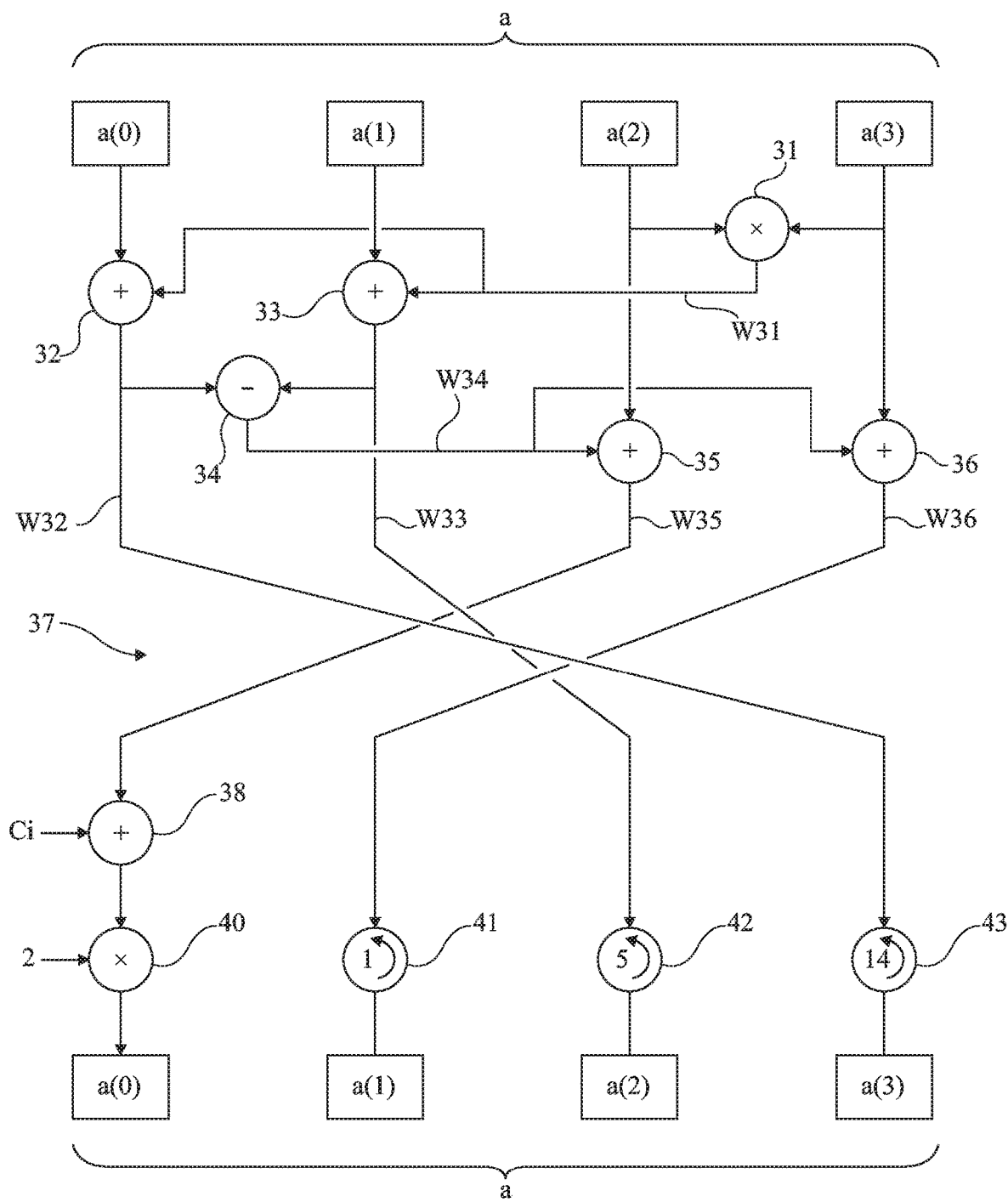
FIG. 3 very schematically shows in the form of blocks an embodiment of a round of the function of FIG. 2.

FIG. 3 very schematically shows in the form of blocks an embodiment of a round R of encryption function f of FIG. 2.

The round function illustrated in FIG. 3 processes a block a of one hundred and twenty-eight (128) codes or digits in base 7, that is, each code is an element of the finite body of order 7 ($GF(7)=\{0, 1, 2, 3, 4, 5, 6\}$). Each of the hundred and twenty-eight codes may be binarily represented by a triplet of three bits. Indeed, in technologies manipulating bits, the codes in base 7 are represented in binary form within function f.

According to the embodiment described in FIG. 3, a state "a" processed by the round function comprises four words a(0), a(1), a(2), a(3) of thirty-two (32) codes in base 7 each.

By arbitrary convention, the index of the word is called x hereafter. Thus, a state a comprises four words a(x), x being in the range from 0 to 3. The index of the code of a word is called z. Thus, each word a(x) comprises 32 codes a(x, z), z being in the range from 0 to 31. Finally, each code may be represented by a triplet of bits (a(x, z, 0), a(x, z, 1), a(x, z, 2)), with $a(x, z)=a(x, z, 0)+2 \cdot a(x, z, 1)+4 \cdot a(x, z, 2)$.

It can already be seen that triplet $(a(x, z, 0), a(x, z, 1), a(x, z, 2))=(1, 1, 1)$ should never appear during the execution of function f. Advantage can then be taken of this characteristic to detect in extremely simple fashion a malfunction, be it intentional (attack) or not. Indeed, a simple logic combination (for example performing a three-input AND-type function) of the triplets manipulated by the encryption circuit immediately supplies, on a bit, an error detection signal.

FIG. 3 illustrates a round, called of rank i, of permutation f. As previously indicated, number n of rounds is set according to the resistance desired for the algorithm. As a specific example embodiment, the number of rounds is 24 or 48. It should however be noted that there may be any number of rounds, which may be selected between the robustness desired for the algorithm and the execution duration.

The round permutation may be illustrated in the form of four lines 0, 1, 2, and 3 implementing, at each step of the round, an elementary operation over the thirty-two codes $a(x, z)$ of state $a(x)$ (words $a(0)$, $a(1)$, $a(2)$, and $a(3)$). Reference is made hereafter to the operations modulo 7 of states $a(x)$ and codes $a(x, z)$. The operations (addition, multiplication, subtraction) are performed, code by code, modulo 7.

It is started by successively multiplying (operation 31, x) the thirty-two codes $a(2, z)$ of word $a(2)$ by the thirty-two codes $a(3, z)$ of word $a(3)$, that is, a multiplication modulo 7 of words $a(2)$ and $a(3)$. In other words, the multiplication is performed code by code.

The result of multiplication 31 is then added (operations 32 and 33), modulo 7, to the codes of words $a(0)$ and $a(1)$. This amounts to adding, code by code, successively the thirty-two codes $a(0, z)$ of word $a(0)$ to the thirty-two codes of result W31 of multiplication 31, and successively the thirty-two codes $a(1, z)$ of word $a(1)$ to the thirty-two codes of result W31.

Then, result W33 of addition 33 is subtracted (operation 34) modulo 7 and code by code, from result W32 of addition 32.

Then, result W34 of subtraction 34 is added (operations 35 and 36) modulo 7 to words a2 and a3. In other words, the thirty-two codes in body GF7 of word W34 are successively added, code by code, to the thirty-two codes $a(2, z)$ of word $a(2)$, and successively to the thirty codes $a(3, z)$ of word $a(3)$.

Then (step 37), a transposition of words W32, W33, W35 and W36 resulting from operations 32, 33, 35 and 36 is performed. Thus:
word W32 ($a(0)$) becomes word $a(3)$ of line 3;
word W33 ($a(1)$) becomes word $a(2)$ of line 2;
word W35 ($a(2)$) becomes word $a(0)$ of line 0; and
word W36 ($a(3)$) becomes word $a(1)$ of line 1.

A next step comprises adding code by code (operation 38), modulo 7, a round constant $C_i$, in the form of a word of thirty-two codes in base 7, to word W35 ($a(0)$). Round constant $C_i$ is different for each round.

A last step of the round comprises:
multiplying (operation 40), modulo 7, the result of addition 38 by two, which amounts to multiplying, code by code, each of the thirty-two codes by two;
performing a circular shift (operation 41), modulo 32, by one position of codes $a(1, z)$ of word a1 (W36), each code $a(1, z)$ becoming code $a(1, z-1)$ except for code $a(1, 0)$ which becomes code $a(1, 31)$;
performing a circular shift (operation 42), modulo 32, by five position of codes $a(2, z)$ of word a2 (W33), each code $a(2, z)$ becoming code $a(2, z-5)$ except for codes $a(2, 4)$, $a(2, 3)$, $a(2, 2)$, $a(2, 1)$, and $a(2, 0)$ which respectively become $a(2, 31)$, $a(2, 30)$, $a(2, 29)$, $a(2, 28)$, and $a(2, 27)$; and
performing a circular shift (operation 43), modulo 32, by fourteen positions of codes $a(3, z)$ of word a3 (W32), each code $a(3, z)$ becoming code $a(3, z-14)$ except for codes $a(3, 13)$, $a(3, 12)$, $a(3, 11)$, $a(3, 10)$, $a(3, 9)$, $a(3, 8)$, $a(3, 7)$, $a(3, 6)$, $a(3, 5)$, $a(3, 4)$, $a(3, 3)$, $a(3, 2)$, $a(3, 1)$, and $a(3, 0)$ which respectively become $a(3, 31)$, $a(3, 30)$, $a(3, 29)$, $a(3, 28)$, $a(3, 27)$, $a(3, 26)$, $a(3, 25)$, $a(3, 24)$, $a(3, 23)$, $a(3, 22)$, $a(3, 21)$, $a(3, 20)$, $a(3, 19)$, and $a(3, 18)$.

The result of operations 40, 41, 42, and 43 respectively form outputs $a(0)$, $a(1)$, $a(2)$, and $a(3)$ of the current round of rank i. These states typically become the input states of the next round or the result of function f.

Figure 4:
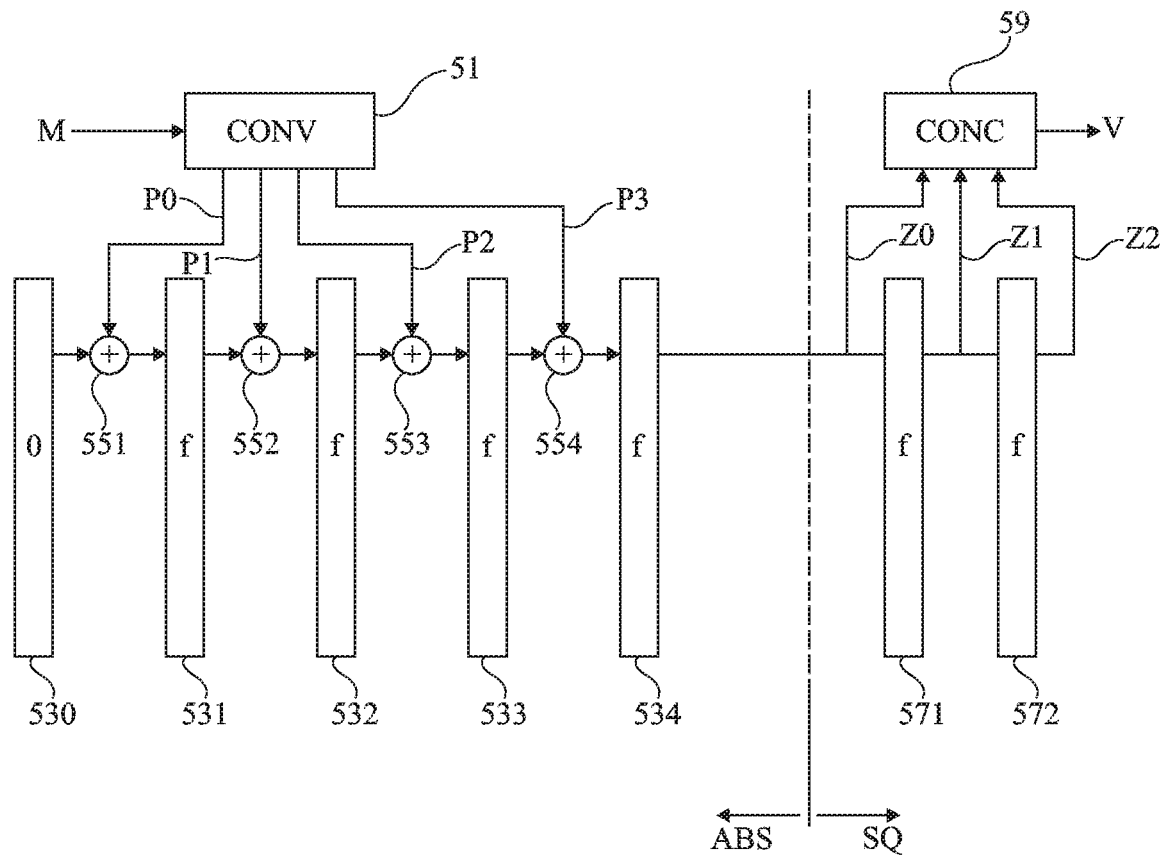
FIG. 4 schematically shows in the form of blocks an example of a function of the type to which the described function may apply.

FIG. 4 schematically shows in the form of blocks an example of an algorithm of the type to which the described encryption function f may apply.

The example of FIG. 4 corresponds to an algorithm known as "sponge", which implements an absorbing phase ABS and a squeezing phase SQ, where a string having an arbitrary desired length is generated from the output state of the absorbing phase.

This type of algorithmic scheme is for example described in https://keccak.team/sponge_duplex.html, which is incorporated herein by reference to the maximum extent allowable by law. A message M is converted, by a block 51 (CONV), into four words P0, P1, P2, and P3 of a given number of codes, each code being in base 7.

Absorbing phase ABS comprises any number of cycles, for example, four cycles 531, 532, 533 et 534, of application of permutation f to the results of an addition (operations 551, 552, 553, and 554), by codes modulo 7, of one of words P0 to P3, respectively to an initial value 530 for operation 551 or to the result of the previous cycle 531, 532, or 533 for operations 552, 553, and 554. Initial value 530 is for example zero (0) but may be any value, provided for it to be fixed. In an application using a key, the key may be contained in the initial value.

This result (output of cycle 534) is submitted to squeezing phase SQ, which for example comprises two successive cycles 571 and 572 of application of function f. First cycle 571 receives the result of cycle 534. Second cycle 572 receives the result of cycle 571. The respective outputs of cycles 534, 571, and 572 are further extracted to form values Z0, Z1, and Z2 which are concatenated (operation 59, CONC) to provide result V. The number of cycles 57 (here, two, 571 and 572) may be greater than two. It depends on the size desired for result V.

Each cycle 531, 532, 533, 534, 571, and 572 comprises the application of function f, that is, the n rounds of FIG. 2 (or n times the round permutation of FIG. 3).

FIG. 4 is an example only of algorithm to which the function described in relation with FIGS. 2 and 3 may apply. This function actually has an autonomous operation and may be used by any encryption permutation, or even in a block ciphering.

Steps 51 and 59 (FIG. 4) of conversion from binary to base 7 and from base 7 to binary may take various forms. For example, conversion tables may be used. Such tables are particularly adapted for the conversion in the binary-to-base 7 direction. In the base 7-to-binary direction, an accumulator of the results of each application of function f may as a variation be used. Instructions of a program are then stored into non-volatile memory 13.

An advantage of the described embodiments is that function f may be implemented in hardware or software fashion.

Another advantage of the described embodiments is that function f is independent from the rest of the structure of the encryption algorithm. Thus, it is not limited to a specific algorithm structure.

Function f is for example at least partially achieved in the form of hardware operators (logic operator) controlled by program instructions stored in memory 13 of the circuit implementing an algorithm using this function. As a variation, the function is implemented in software fashion by a processor, for example, processing unit 11.

Figure 5:
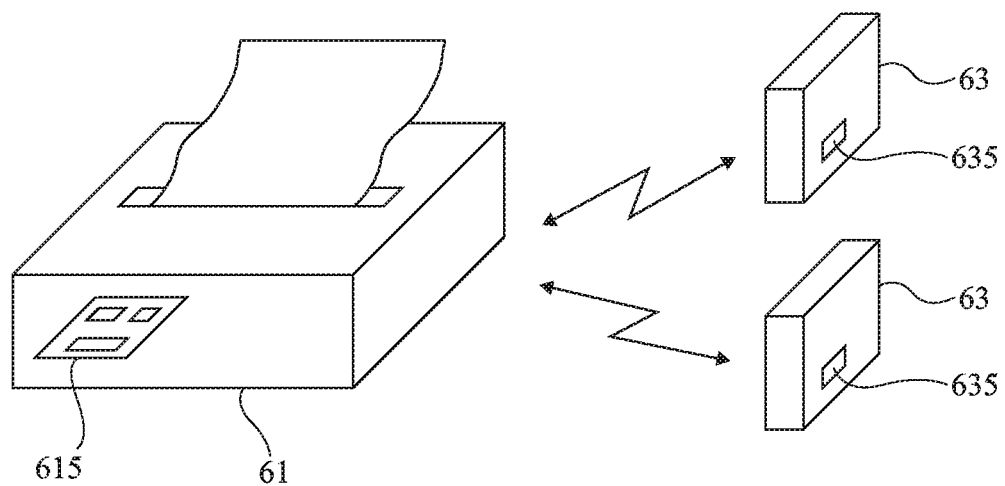
FIG. 5 very schematically shows in the form of blocs an embodiment of a printing system to which the described encryption function applies as an example.

FIG. 5 very schematically shows in the form of blocks an embodiment of a printing system to which the described encryption permutation applies as an example.

According to this example, the system comprises a printer 61 and one or a plurality of ink cartridges 63. More generally, the system may comprise a printer and any replaceable or consumable element associated with the printer, for example, spare parts of print head type.

Printer 61 and each cartridge 63 comprises one or a plurality of electronic circuits 615, respectively 635. Circuits 615 and 635 are of the type of circuit 1 described in relation with FIG. 1. In particular, circuits 615 and 635 comprise at least: a memory (13, FIG. 1); a processing unit (11, FIG. 1), for example, a processor or a wired logic state machine; an input/output interface (17, FIG. 1) to communicate, among others, with the other portion (cartridge or printer) of the system; and an encryption function of the type of above-described function 2.

One or a plurality of keys are stored in the (non-volatile) memory 13 of circuit 615 and of circuit 635. These keys are used in a process of authentication of a cartridge by a printer.

Figure 6:
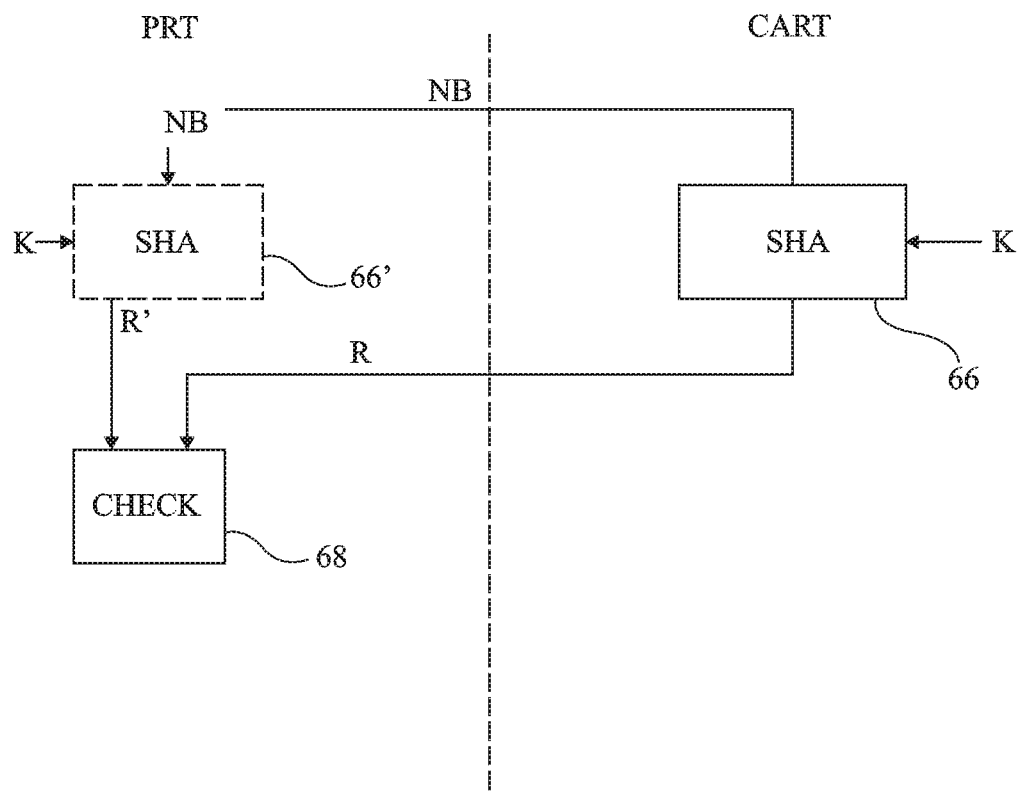
FIG. 6 very schematically shows in the form of blocks a simplified example of implementation of a method of authentication of a cartridge by a printer.

FIG. 6 very schematically shows in the form of blocks a simplified example of implementation of a method of authentication of a cartridge by a printer.

According to this simplified embodiment, upon each powering-on and/or periodically and/or upon each installation of a new cartridge, printer PRT starts an authentication process.

Multiple authentication processes implementing signature calculation or hash mechanisms, such as for example SHA, are known. Any algorithm capable of using the described encryption function f may be used. The SHA algorithm, and more particularly SHA-3, is an algorithm using a sponge function of the type illustrated in FIG. 4.

In the example of FIG. 6, it is assumed in simplified fashion that the printer circuit selects a number NB, for example, randomly. Number NB for example forms message M to be submitted to the sponge function (FIG. 4). Number NB is transmitted by the printer to the circuit of cartridge CART so that the latter submits it to signature algorithm 66, using the sponge function based on encryption function f. Result R or information which is a function of this result is returned by cartridge CART to printer PRT.

It is assumed that the cartridge calculates the signature by using a key K, which is totally or partly used in the initial value (530, FIG. 4) of the sponge function.

In the example of FIG. 6, it is also assumed that the printer (the electronic circuit that it comprises) has the same signature algorithm as the cartridge and that it also calculates (block 66') a result R' of signature of number NB. The printer and the cartridge share in this example the same key, but more complex mechanisms implying derivations of keys (for example session keys) or key transmissions may be used, without for this to affect the principle of the use of encryption function f. The printer is then capable of verifying (block 68, CHECK) whether the signature calculated by the cartridge based on number NB is identical to the signature that it has itself calculated. If the cartridge is authentic, then the printer authorizes its use in the printing operations carried out by the printer. If not, various forms of countermeasures, usual per se, may be provided, for example, a turning-off of the printer, the emitting of an error message, a total or partial locking of functions of the printer, etc.

The exchanges between circuits 615 and 635 of the printer and of the cartridge may be encrypted.

Various embodiments have been described. Various alterations, modifications, and improvements will readily occur to those skilled in the art. In particular, the selection of the number of rounds may vary from one application to another.

Further, the described function and/or method may be implemented in the form of a table or set of results representative of their application to a set of numbers. Such results are then stored in a memory, such as a non-volatile memory, and are extracted according to a number communicated, by the cartridge or by the printer. Similarly, any circuit outputting a result representative of an application of the described function and/or method to a number may be used. Such a circuit may be associated with a memory and/or be configured to execute a program representative of the described function and/or method. Further, all that has been described may be implemented in software or hardware fashion or by a combination of both.

Finally, the practical implementation of the embodiments which have been described is within the abilities of those skilled in the art by using the functional indications given hereabove. Further, although the specific example of a signature calculation to authenticate a printer cartridge has been given, the described encryption function may be more generally used in any mechanism of authentication of one component by another, provided for the two components to be equipped with the adapted circuits and/or memories, and more generally in any encryption mechanism.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
protecting, using four words, each word representing codes in base 7, an electronic circuit during execution of a cryptographic operation by the electronic circuit, wherein the cryptographic operation comprises authentication of a replaceable printer component by a printer, the protecting including:
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication, wherein the protecting is performed by one of the replaceable printer component or the printer.

2. The method of claim 1 wherein each word comprises thirty-two codes.

3. The method of claim 1 wherein the circular shifts are respectively by one, five, and fourteen positions.

4. The method of claim 1 wherein each code in base 7 is represented as a triplet of binary states.

5. The method of claim 1 wherein the protecting is an iterative process, a last state of an iteration forming an initial state of a next iteration.

6. The method of claim 1 wherein the cryptographic operation comprises a hashing function.

7. The method of claim 6, comprising converting a message to base 7.

8. The method of claim 6 wherein the protecting is an iterative process applied a plurality of times.

9. The method of claim 1 wherein the protecting comprises protecting information manipulated by the electronic circuit.

10. The method of claim 4 wherein an occurrence of a determined triplet identifies an error.

11. The method of claim 1 wherein the electronic circuit is included in the printer.

12. The method of claim 1 wherein the electronic circuit is included in the replaceable printer component.

13. The method of claim 12 wherein the replaceable printer component performs the protecting.

14. A device, comprising:
one or more memories; and
digital signal processing circuitry coupled to the one or more memories, which, in operation, protects, using four words, each word representing codes in base 7, a cryptographic operation to authenticate a replaceable printer component by a printer, the protecting including:
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication, wherein the protecting is performed by one of the replaceable printer component or the printer.

15. The device of claim 14 wherein each word comprises thirty-two codes.

16. The device of claim 14 wherein the circular shifts are respectively by one, five, and fourteen positions.

17. The device of claim 14 wherein each code in base 7 is represented as a triplet of binary states.

18. The device of claim 14 wherein the protecting is an iterative process, a last state of an iteration forming an initial state of a next iteration.

19. The device of claim 14 wherein the cryptographic operation comprises a hashing function.

20. The device of claim 14 wherein the protecting comprises generating the four words.

21. The device of claim 14 wherein the protecting comprises protecting information manipulated by the cryptographic operation.

22. The device of claim 14 wherein an occurrence of a determined triplet identifies an error in the cryptographic operation.

23. The device of claim 14 wherein the device is a included in the printer.

24. The device of claim 14 wherein the device is a included in the replaceable printer component.

25. The device of claim 24 wherein the replaceable printer component performs the protecting.

26. A system, comprising:
one or more functional circuits; and
digital signal processing circuitry coupled to the one or more functional circuits, which, in operation, protects, using four words, each word representing codes in base 7, execution of a cryptographic operation to authenticate a replaceable printer component by a printer, the protecting including:
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;

adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication, wherein the protecting is performed by one of the replaceable printer component or the printer.

27. The system of claim 26 wherein a result of the cryptographic operation is related to a function of the functional circuitry.

28. The system of claim 26 wherein each code in base 7 is represented as a triplet of binary states.

29. The system of claim 26 wherein the protecting includes detecting an error during execution of the cryptographic operation.

30. The system of claim 29 wherein the error is a fault injection error.

31. A non-transitory computer-readable medium having contents which configure digital signal processing circuitry to perform a method, the method comprising:
protecting, using four words, each word representing codes in base 7, a cryptographic operation executed by the digital signal processing circuitry, wherein the cryptographic operation comprises authentication of a replaceable printer component by a printer, the protecting including:
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication, wherein the protecting is performed by one of the replaceable printer component or the printer.

32. The computer-readable medium of claim 31 wherein each word comprises thirty-two codes.

33. The computer-readable medium of claim 31 wherein the contents comprise instructions executed by the digital signal processing circuitry.

34. The computer-readable medium of claim 31 wherein the contents comprise a set of results representative of the application of the method to a set of numbers.

35. The computer-readable medium of claim 31 wherein the digital signal processing circuitry comprises circuitry of the replaceable printer component.

36. A non-transitory computer-readable medium having contents which configure digital signal processing circuitry to perform a method, the method comprising:
receiving a number;
generating an output based on the number; and
protecting a cryptographic operation using the output, wherein the cryptographic operation comprises authentication of a replaceable printer component by a printer and the protecting is performed by one of the replaceable printer component or the printer, wherein the output corresponds to:
representing the number as four words, each word representing codes in base 7;
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication.

37. The computer-readable medium of claim 36 wherein the contents comprise a look-up table to convert numbers to corresponding outputs.

38. The computer-readable medium of claim 36 wherein the digital signal processing circuitry comprises processing circuitry of the replaceable printer component.

39. A method, comprising:
receiving a number;
generating an output based on the number; and
protecting a cryptographic operation using the output, wherein the cryptographic operation comprises authentication of a replaceable printer component by a printer and the protecting is performed by one of the replaceable printer component or the printer, wherein the output corresponds to:
representing the number as four words, each word representing codes in base 7;
multiplying, code by code, a third word of the four words by a fourth word of the four words;
adding, code by code, a result of the multiplying to a first word of the four words;
adding, code by code, the result of the multiplying to a second word of the four words;

subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication.

40. The method of claim 39 wherein the generating the output comprises retrieving the output from a look-up table.

41. The method of claim 39 wherein the cryptographic operation is performed by processing circuitry of a replaceable printer component.

42. A device, comprising:
one or more memories; and
processing circuitry coupled to the one or more memories, wherein the processing circuitry, in operation:
generates an output based on a number; and
protecting protects a cryptographic operation using the output, wherein the cryptographic operation comprises authentication of a replaceable printer component by a printer and the protecting is performed by one of the replaceable printer component or the printer, wherein the output corresponds to:
representing the number as four words, each word representing codes in base 7;
multiplying, code by code, a third word of the four words by a fourth word of the four words;
adding, code by code, a result of the multiplying to a first word of the four words;
adding, code by code, the result of the multiplying to a second word of the four words;
subtracting, code by code, a result of the addition to the second word from a result of the addition to the first word;
adding, code by code, a result of the subtraction to the third word;
adding the result of the subtraction to the fourth word;
combining, code by code, with a round constant, a result of the adding the third word to the result of the subtraction;
multiplying by two, code by code, a result of said combination;
circularly shifting codes of a result of the adding the fourth word to the result of the subtraction;
circularly shifting codes of the result of adding the second word to the result of the multiplication; and
circularly shifting codes of the result of adding the first word to the result of the multiplication.

43. The device of claim 42 wherein the generating the output comprises retrieving the output from a look-up table.

44. The device of claim 42 wherein the device comprises a is included in the replaceable printer component.

* * * * *

UNITED STATES PATENT AND TRADEMARK OFFICE
CERTIFICATE OF CORRECTION

PATENT NO. : 11,025,426 B2  
APPLICATION NO. : 16/249799  
DATED : June 1, 2021  
INVENTOR(S) : Joan Daemen Page 1 of 1

It is certified that error appears in the above-identified patent and that said Letters Patent is hereby corrected as shown below:

In the Claims

Column 12, Line 45, Claim 23:
"device is a" should read, --device is--.

Column 12, Line 47, Claim 24:
"device is a" should read, --device is--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*